United States Patent [19]
Anderson

[11] 3,905,566
[45] Sept. 16, 1975

[54] JET ENGINE INTAKE PROTECTION SYSTEM

[76] Inventor: Edwin R. Anderson, 417 Clintwood Ave., La Puente, Calif. 91744

[22] Filed: Aug. 29, 1972

[21] Appl. No.: 284,569

[52] U.S. Cl. ............................ 244/53 B; 60/39.09 P
[51] Int. Cl.² ........................................ B64D 33/02
[58] Field of Search ...... 244/53 R, 53 B, 74, 134 R; 55/306; 60/39.09 P

[56] References Cited
UNITED STATES PATENTS

| | | | |
|---|---|---|---|
| 2,915,262 | 12/1959 | Klein | 244/53 B |
| 3,298,637 | 1/1967 | Lee | 244/53 B |
| 3,527,430 | 9/1970 | Smith | 244/53 B |
| 3,599,429 | 8/1971 | Bigelis et al. | 244/53 B X |

Primary Examiner—Trygve M. Blix
Assistant Examiner—Barry L. Kelmachter
Attorney, Agent, or Firm—Wills, Green & Mueth

[57] ABSTRACT

This patent relates to and describes a jet engine having a forward intake end, a rear exhaust end, and gas jets for forming a fluid barrier in proximity to the lower leading portion of the forward intake end, said fluid barrier moving forwardly of the intake end and generally below and parallel to the direction of the flow of air into the intake end to prevent the ingestion of particulate matter into the engine.

3 Claims, 7 Drawing Figures

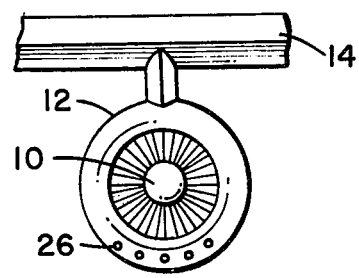
FIG.—1
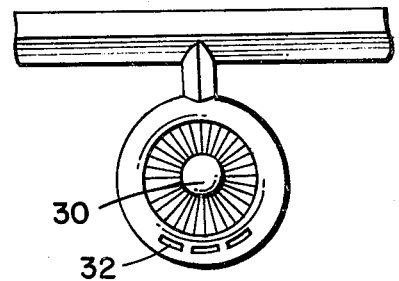
FIG.—3
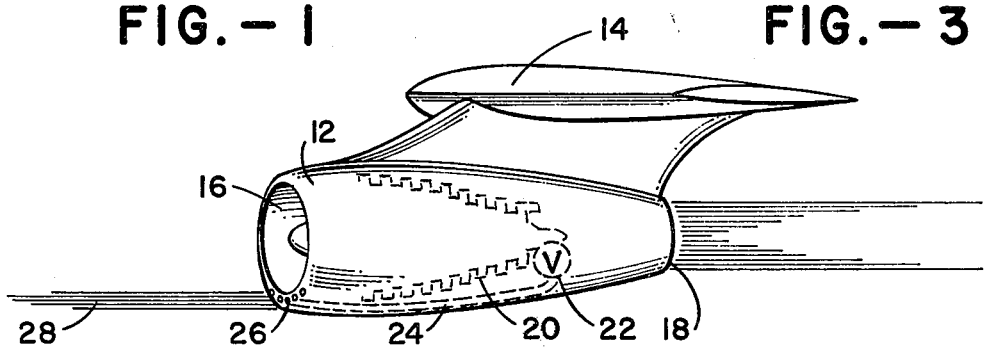
FIG.—2
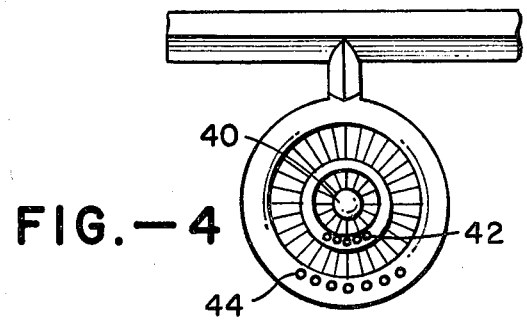
FIG.—4
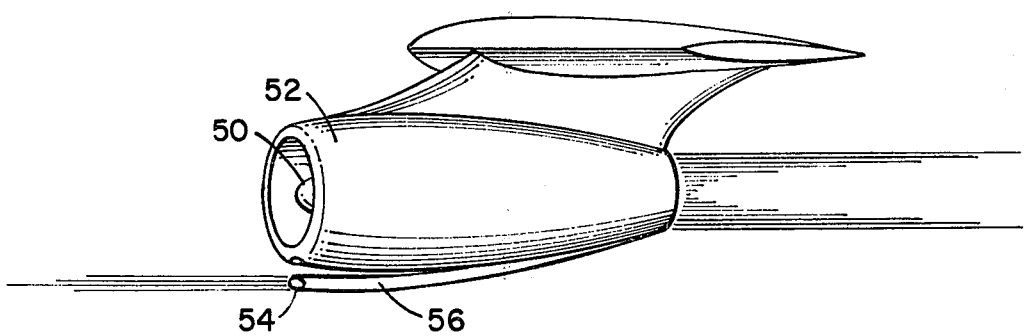
FIG.—5

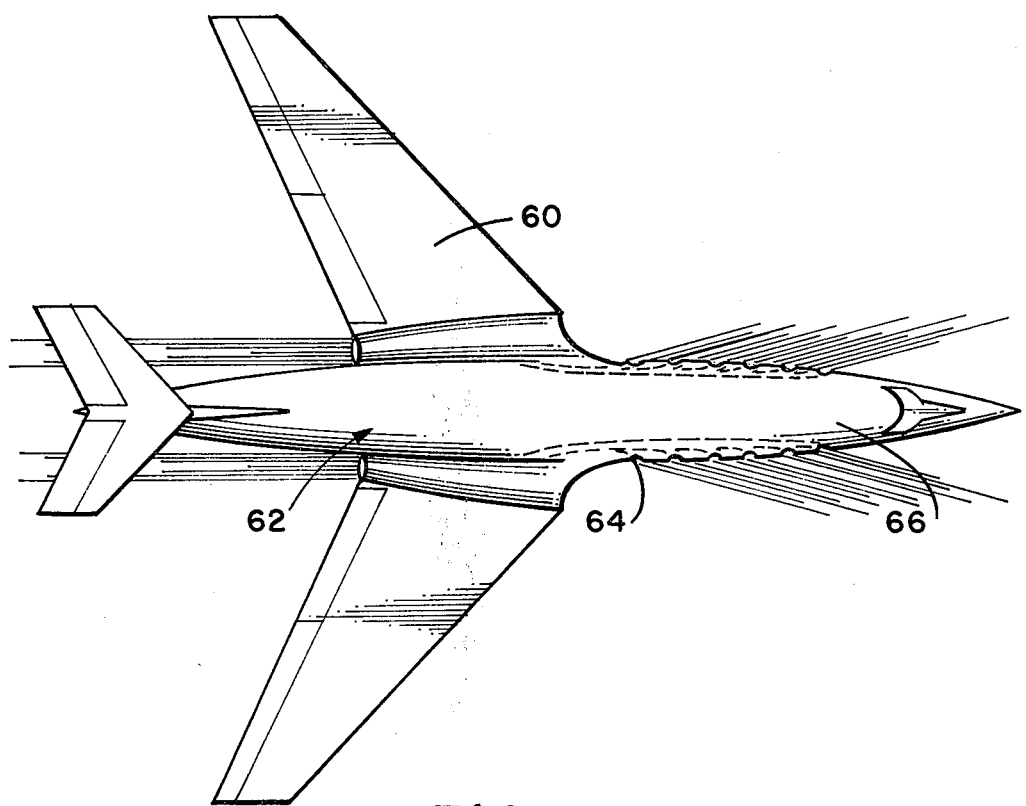
FIG. — 6
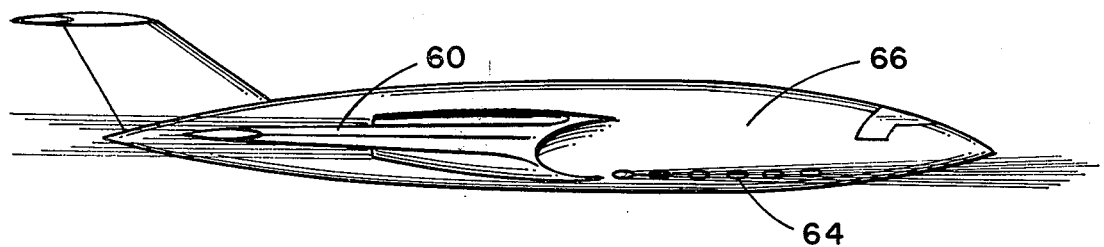
FIG. — 7

3,905,566

JET ENGINE INTAKE PROTECTION SYSTEM

BACKGROUND OF INVENTION

The present invention is an improvement in the prevention of the ingestion of dirt and other particles into the intake of jet engines commonly used in aircraft. Klein U.S. Pat. No. 2,915,262 recognizes that the ingestion of particles into a jet engine is due to the formation of a vortex extending from the ground surface to the inlet of the engine. The vortex is the result of the existence of a point of stagnation of air flow adjacent the ground surface due to the convergence of air flow parallel to the ground. Klein proposes to displace the point of stagnation by establishing a flow pattern parallel to the ground which is the direct opposite of the sink, that is, a downward flow of air is directed toward the ground and upon striking the ground the flow is deflected outwardly in substantially all directions or is deflected outwardly in fan form. This procedure is ineffective to prevent the ingestion of certain types of particles, and in fact, the downward flow of air striking the ground in Klein tends to stir up particles on the ground surface in the area upstream of the air flow into the jet engine inlet, actually causing ingestion of particles into the engine.

Lee U.S. Pat. No. 3,298,637 relates to a jet engine having apertures circumferentially disposed about the engine inlet for forming a fan-like circular fluid flow about the intake which is intended to inhibit the ingestion of particulate matter.

The present invention is intended to more effectively deal with the problem. More specifically, the present invention provides a barrier around the intake end of a jet engine wherein said barrier is generally parallel to the flow of air into the engine, thereby eliminating the condition existent in the prior art which the barrier fluid itself by striking the ground tends to stir up particulate matter.

SUMMARY OF INVENTION

Briefly, this invention comprises a jet engine having a forward intake end, rear exhaust end, and means for forming a fluid barrier in proximity to the lower leading portion of the forward intake end, said fluid barrier moving forwardly of said intake end and generally below and parallel to the direction of the flow of air into said intake end to prevent the ingestion of particulate matter into said engine.

It is an object of my invention to provide a new and improved means for preventing the ingestion of particulate matter into jet engines.

More specifically, it is an object of this invention to prevent ingestion of particulate matter into jet engines by means which provide a flow of air generally below and parallel to the flow of air into the jet engine.

These and other objects and advantages of this invention will be apparent from the following detailed discussion and the accompanying drawings.

DESCRIPTION OF PREFERRED EMBODIMENTS

Turning to the drawings:

FIG. 1 is a front view of one embodiment of this invention.

FIG. 2 is a perspective view of the embodiment of FIG. 1.

FIG. 3 is a front view of another embodiment of this invention.

FIG. 4 is a front view of yet another embodiment of this invention.

FIG. 5 is a perspective view of still another embodiment of this invention.

FIG. 6 is a top view of an embodiment of the invention wherein the engines are carried in the wings rather than in pods beneath the wings.

FIG. 7 is a side view of the embodiment of FIG. 6.

Considering the drawings in greater detail, in FIGS. 1 and 2 there is shown a typical reaction type jet engine 10 mounted in pod 12 and supported by and below aircraft wing 14. The engine inlet 16 allows air for the support of combustion to be drawn into the engine 10. The main portion of combustion gases exits at tail pipe 18. The engine has a compressor 20 having a bleed-off valve 22. A portion of the air from compressor 20 is bled off via tubing 24 to the orifices 26. It is the fluid discharged via orifices 26 which create the gas flow 28 which is generally parallel to and below the flow of inlet air to engine 10. Generally, it is necessary to provide orifices 26 only at the lower leading area of the engine; however, the invention is not limited in this respect.

Obviously, the flow of air to the orifices 26 is controlled by the operation of valve 22. The valve 22 is normally controlled by a solenoid. The solenoid may be operated from within the cockpit by a switch, or may be provided with automatic regulating means to prevent their opening while the aircraft is in flight.

FIG. 3 simply shows another engine 30 having orifces 32 of a different shape.

FIG. 4 shows a high by-pass fan jet engine 40 wherein orifices are provided both at the lower edge of the main engine inlet (orifices 42) and at the lower edge of the pod, just below the periphery of the fan (orifices 44).

In FIG. 5, engine 50 is mounted in pod 52, said pod carries the orifices 54 in generally horizontally disposed tubes 56 just below the pod which can be retracted when not in use.

In FIGS. 6 and 7 the engines are carried within the wings 60 of aircraft 62. In this embodiment, the fluid for preventing the ingestion of particulate matter is directed forwardly and is discharged via orifices 64 in the fuselage 66 of the aircraft 62.

Having fully described the invention, it is intended that it be limited only by the scope of the appended claims.

I claim:

1. A jet aircraft provided with a jet engine, the lengthwise dimension of said jet engine being fixedly generally parallel to the lengthwise dimension of said aircraft, said jet engine having a forward intake end, a rear exhaust end, and means for forming a fluid barrier in proximity to the lower leading portion of the forward intake end, said fluid barrier moving forwardly of said intake end and generally below and parallel to the direction of the flow of air into said intake end to prevent the ingestion of particulate matter into said engine, a vortex being generated when said engine is in operation from a point below said engine upwardly to said forward intake end, said means for forming a fluid-barrier comprising a plurality of forwardly facing openings in said lower leading portion and means for producing a flow of high pressure gases therethrough to form said fluid barrier which interdicts the upward movement of particulate matter in said vortex, said engine being carried in a pod beneath the wings of said aircraft, said engine being a fan jet and said means for forming includes two sets of orifices, one set at the lower edge of the main engine inlet and the other set at the lower leading edge of the pod.

2. The device of claim 1 wherein said means for forming includes a valve means for diverting fluid from the engine to orifices at the lower portion of the engine inlet.

3. A jet aircraft provided with a jet engine, the lengthwise dimension of said jet engine being fixedly generally parallel to the lengthwise dimension of said aircraft, said jet engine having a forward intake end, a rear exhaust end, and means for forming a fluid barrier in proximity to the lower leading portion of the forward intake end, said fluid barrier moving forwardly of said intake end and generally below and parallel to the direction of the flow of air into said intake end to prevent the ingestion of particulate matter into said engine, a vortex being generated when said engine is in operation from a point below said engine upwardly to said forward intake end, said means for forming a fluid-barrier comprising a plurality of forwardly facing openings in said lower leading portion and means for producing a flow of high pressure gases therethrough to form said fluid barrier which interdicts the upward movement of particulate matter in said vortex, said engine being carried in a pod beneath the wing of said aircraft and said means for forming includes retractable discharge tubes.

* * * * *